May 18, 1965 W. F. NYMAN, JR., ETAL 3,183,770
AUTOMATIC COPY INSTRUMENT FOR PREPARING
MOVIES FROM STILL PICTURES
Filed May 24, 1962 10 Sheets-Sheet 1

INVENTORS
WILLIAM F. NYMAN, Jr.
ROBERT P. MASON
EVERETT L. NOONAN, Jr.
WILLIAM NIEDERAUER
WARREN PUTNAM LIVINGSTON

BY Kane, Dalsimer and Kane
ATTORNEYS

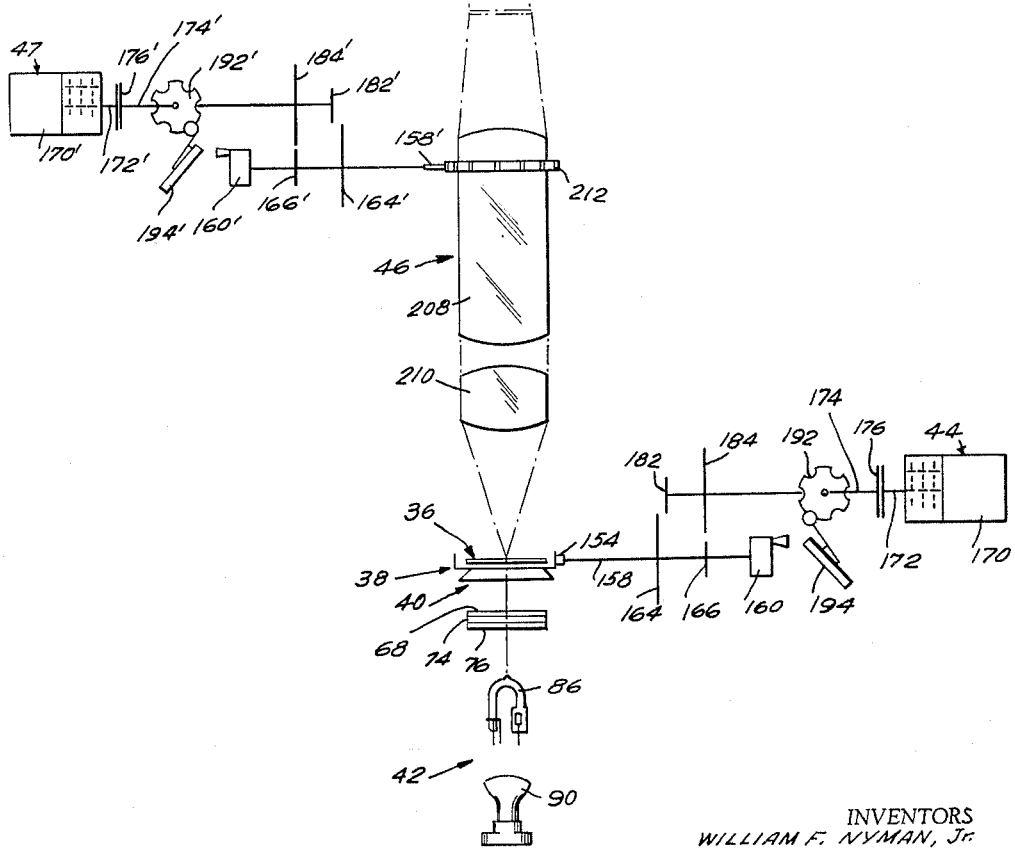

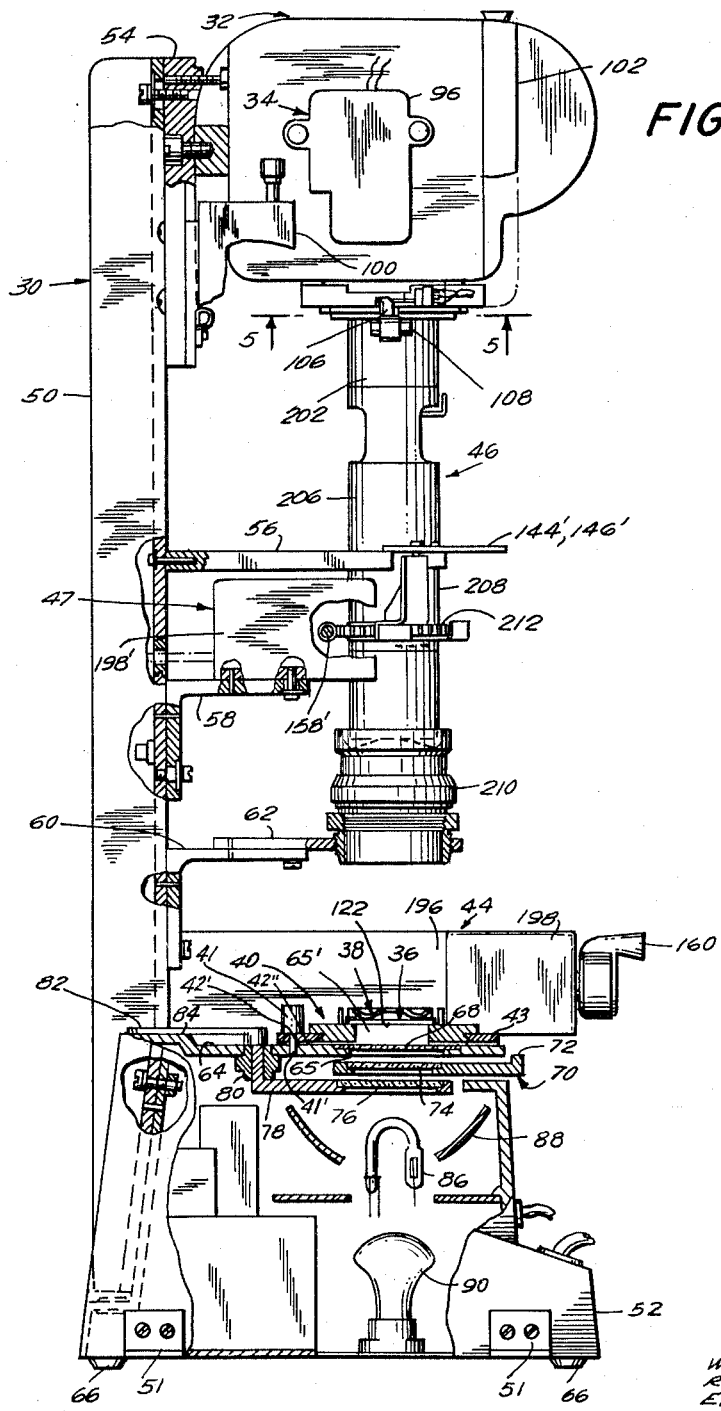

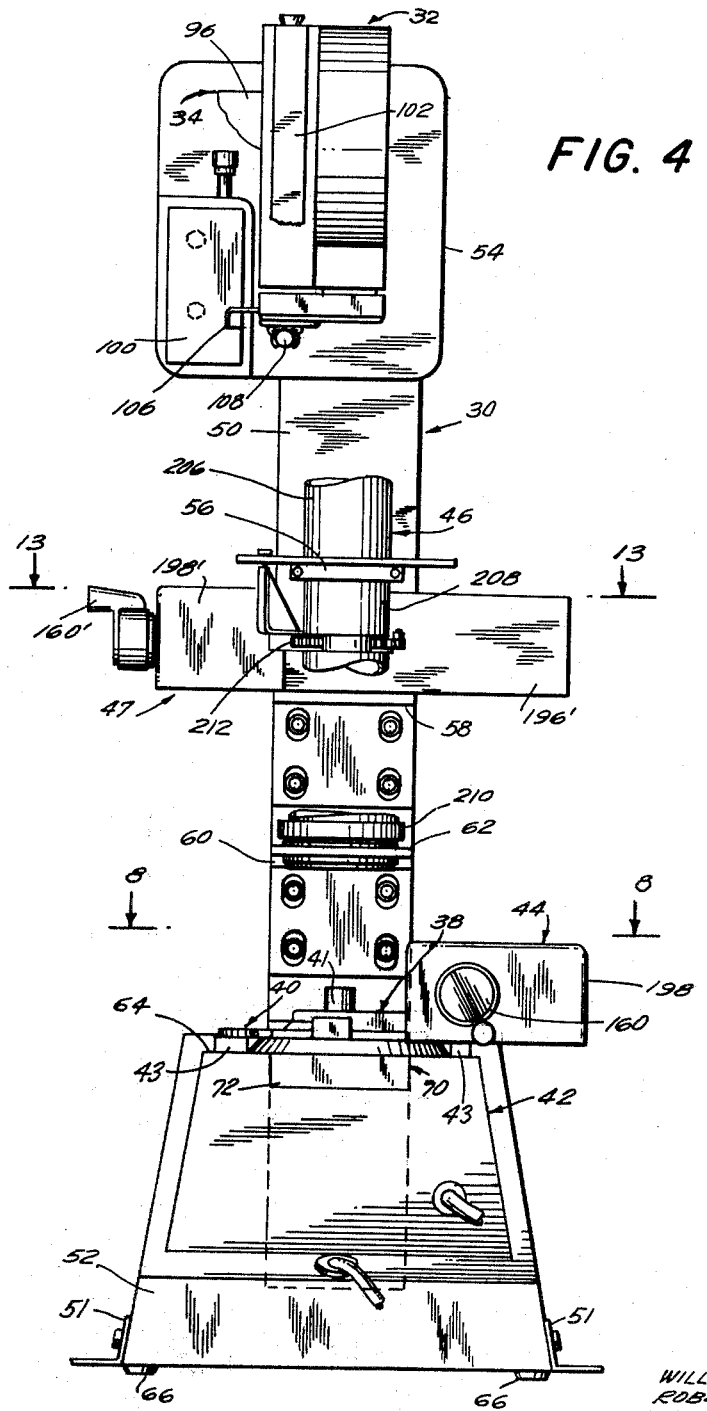

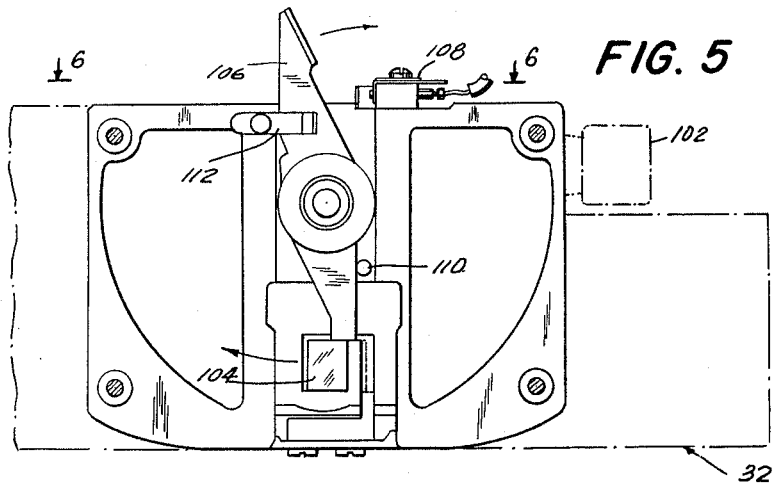
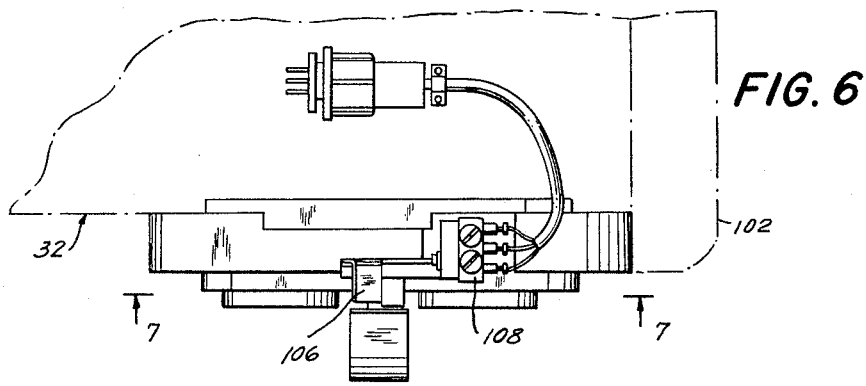
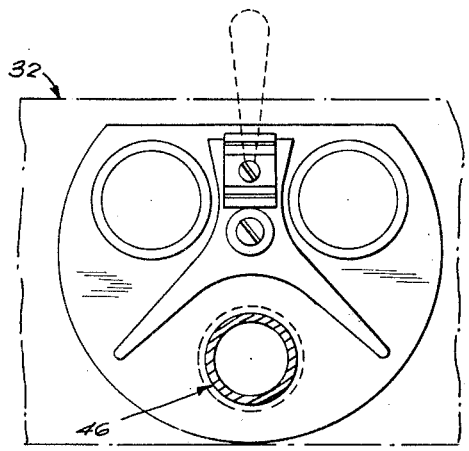

May 18, 1965  W. F. NYMAN, JR., ETAL  3,183,770
AUTOMATIC COPY INSTRUMENT FOR PREPARING
MOVIES FROM STILL PICTURES
Filed May 24, 1962  10 Sheets-Sheet 7
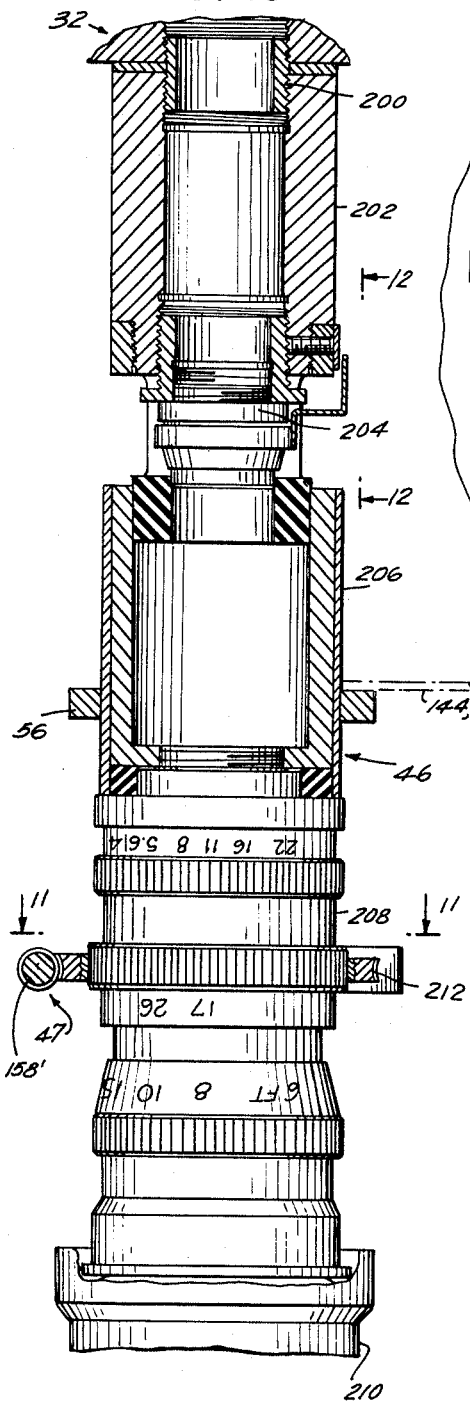
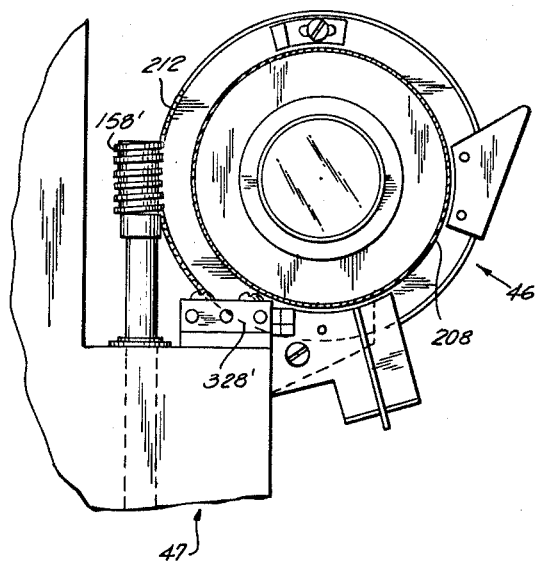
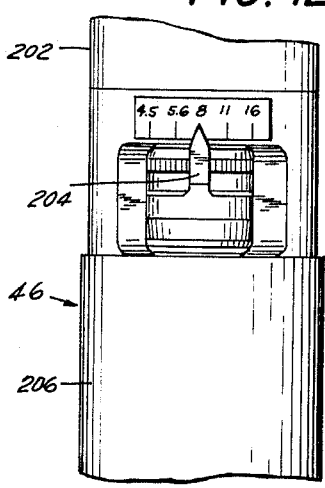
INVENTORS
WILLIAM F. NYMAN, Jr
ROBERT P. MASON
EVERETT L. NOONAN, Jr.
WILLIAM NIERERUER
WARREN PUTNAM LIVINGSTON
BY
Kane, Dalsimer and Kane
ATTORNEYS

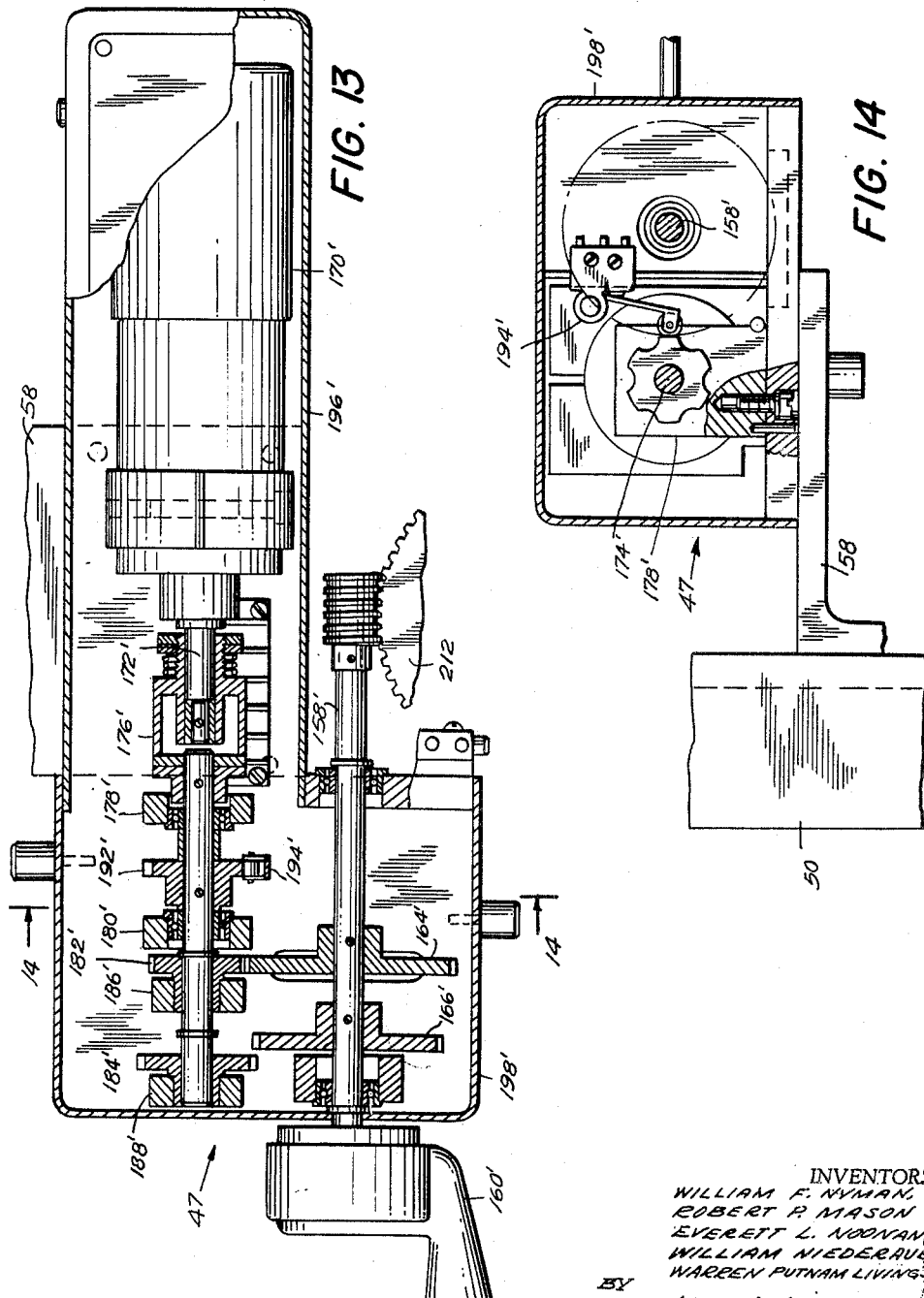

May 18, 1965  W. F. NYMAN, JR., ET AL  3,183,770
AUTOMATIC COPY INSTRUMENT FOR PREPARING
MOVIES FROM STILL PICTURES
Filed May 24, 1962  10 Sheets-Sheet 9

INVENTORS
WILLIAM F. NYMAN, Jr.
ROBERT P. MASON
EVERETT L. NOONAN, Jr.
WILLIAM NIEDERAUER
WARREN PUTNAM LIVINGSTON
BY
Kane, Dalsimer and Kane
ATTORNEYS INVENTORS
WILLIAM F. NYMAN, Jr.
ROBERT P. MASON
EVERETT L. NOONAN, Jr.
WILLIAM NIEDERAUER
WARREN PUTNAM LIVINGSTON
BY
Kane, Dalsimer and Kane
ATTORNEYS

United States Patent Office 3,183,770
Patented May 18, 1965

3,183,770
AUTOMATIC COPY INSTRUMENT FOR PREPARING MOVIES FROM STILL PICTURES
William F. Nyman, Jr., Smithtown, Robert P. Mason, Setauket, Everett L. Noonan, Jr., Staten Island, and William Niederauer, Bay Shore, N.Y., and Warren Putnam Livingston, Summit, N.J., assignors to Bankers Trust Company, New York, N.Y.
Filed May 24, 1962, Ser. No. 197,466
20 Claims. (Cl. 88—24)

This invention relates to an automatic copy instrument and, more particularly, to automatic copying on motion picture film of photographic transparencies, slides and the like, as dictated by the selected operating mode of reproduction which would include straight copying, panning and zooming.

In composing and producing motion picture film, notwithstanding the application or purpose whether it be for educational or training purposes or purely for entertainment, there are a number of factors that may influence the final cost and ultimate content of production. For example, one thing or another may degrade or detrimentally affect the quality of the end product. An entire scene or part thereof may be required to be retaken. Special sets may have to be erected and utilized, not only once, but time and time again if the film footage is not acceptable. Weather conditions may have to be ideal for a particular scene or ultimate effect desired, otherwise the final film may not attain optimum standards. Inherent incident to the foregoing are labor requirements, including skilled, costly personnel and attendants. There is considerable wastage of film footage following the usually employed editing techniques. The weather, climate and natural elements may not be desirable at the time desired to shoot and produce film. A delay of this nature in itself, is extremely significant in the final cost analysis.

The present invention has, as one of its primary objects, the elimination of the foregoing enumerated disadvantages, among others, by providing an automatic copy instrument for copying slide transparencies, film negatives or other sheet material of a reproducible nature whether in color or black and white, while being capable of at least three operating modes including straight copying, panning in any direction in the plane of the sheet being copied and zooming in and out thereof.

It is another object to provide such a copy instrument employing motion picture film as the medium to be exposed and, once the instrument is preset for operation, is adapted upon selection to perform straight copying, panning and zooming operations.

A further object is to provide an automatic instrument with the foregoing capabilities for copying 35 mm. slides onto 16 mm. motion picture film.

Still other objects and advantages include an automatic copy instrument of this kind which is completely automatic, stopping only when a preselected number of frames has been photographed; which includes a zoom lens optical system providing automatic focus at substantially any magnification, which renders it possible to expeditiously compose film through manual controls for actuating the panning mechanism as well as the zoom system in determining the desired extent of each effect; which may be operated by a relatively unskilled instrument operator, once a film script is composed and prepared, who need only preset the instrument for the desired mode of reproduction and number of film exposures; which is capable of performing vignetting and other special effects when desired and, most important of all, an automatic copy instrument capable of producing more sophisticated and more professional effects at greater and optimum speeds, assuring more reliable results and greatly reducing the time spent in reshooting by being able to utilize slide transparencies, for example, which have already recorded a desired scene, available in the instrument users own library or on loan or for sale at other sources.

In accordance with an exemplary embodiment of this invention, which will be described somewhat in detail later, a system is provided for economically synthesising motion picture film from a number of individual color slides. A prepared script ordinarily dictates the picture length and number of particular exposures desired all of which in the final analysis minimizes and, in a number of instances, eliminates the need for editing. As will be appreciated from the following, a voice commentary may be conveniently added and the film will be ready for use.

Briefly stated, the exemplary embodiment permits copying of 35 mm. colored slides onto 16 mm. film. In this connection, a slightly modified commercially available 16 mm. camera is mounted on a stand which also supports a turntable. A holder for the slides to be copied is, in turn, supported by this turntable and is rotatable therewith for orienting the pan axis. Panning of the slide while in this holder is advantageously accomplished by moving the slide vertically or horizontally or along any other axis in the plane of the slide, incrementally between exposures. Zooming, on the other hand, is executed by the operation of a zoom optical system, capable of assuming focus notwithstanding the degree of magnification which again is obtained by increment between frame exposures. A motor drive for the motion picture camera is coupled with the camera and includes a solenoid capable of being pulsed to permit release of a frame at a time sequentially on signal or command. The operation of the panning and zooming mechanisms are synchronized with the operation of the film drive.

An operational sequence, in utilizing the copy instrument, will involve a choice of methods, either straight copy, panning or zooming, selection of the number of frames to be exposed and the initiation of exposure. A light beneath the slide flashes, the camera pulses ahead one frame; and the process repeats until the number of frames selected has been exposed.

A control box with instrumentation, permits the presetting of the number of exposures desired of the slide on the motion picture film. Panning, zooming and exposure by straight copy is automatically obtained once this control is preset.

Other objects and advantages will become apparent from the following detailed description of the invention which is to be taken in conjunction with the accompanying drawings illustrating a somewhat preferred embodiment of the invention and in which:

FIG. 2 is a schematic and diagrammatic view of the instrument with automatic control removed;

FIG. 3 is an enlarged side elevational view of the instrument with certain parts sectioned and others removed for clarity;

FIG. 4 is a front elevational view thereof;

FIG. 5 is an enlarged fragmentary view of the shutter housing and mirror previewer taken along the line 5—5 of FIG. 3;

FIG. 6 is an elevational view along the line 6—6 of FIG. 5 in the direction of the arrows;

FIG. 7 is a sectional view taken along the line 7—7 of FIG. 6;

FIG. 10 is an enlarged elevational view, partly in section of the zoom optical system;

FIG. 11 is a cross-sectional view taken along the line 11—11 of FIG. 10 showing the interconnection of the optical system with the zoom drive;

FIG. 12 is a fragmentary elevational view taken along the line 12—12 of FIG. 10 showing the aperture scale for the relay lens;

FIG. 13 is an enlarged plan view partly in section of the zoom drive mechanism taken along the line 13—13 of FIG. 4;

FIG. 14 is a sectional view taken along the line 14—14 of FIG. 13;

Figure 1:
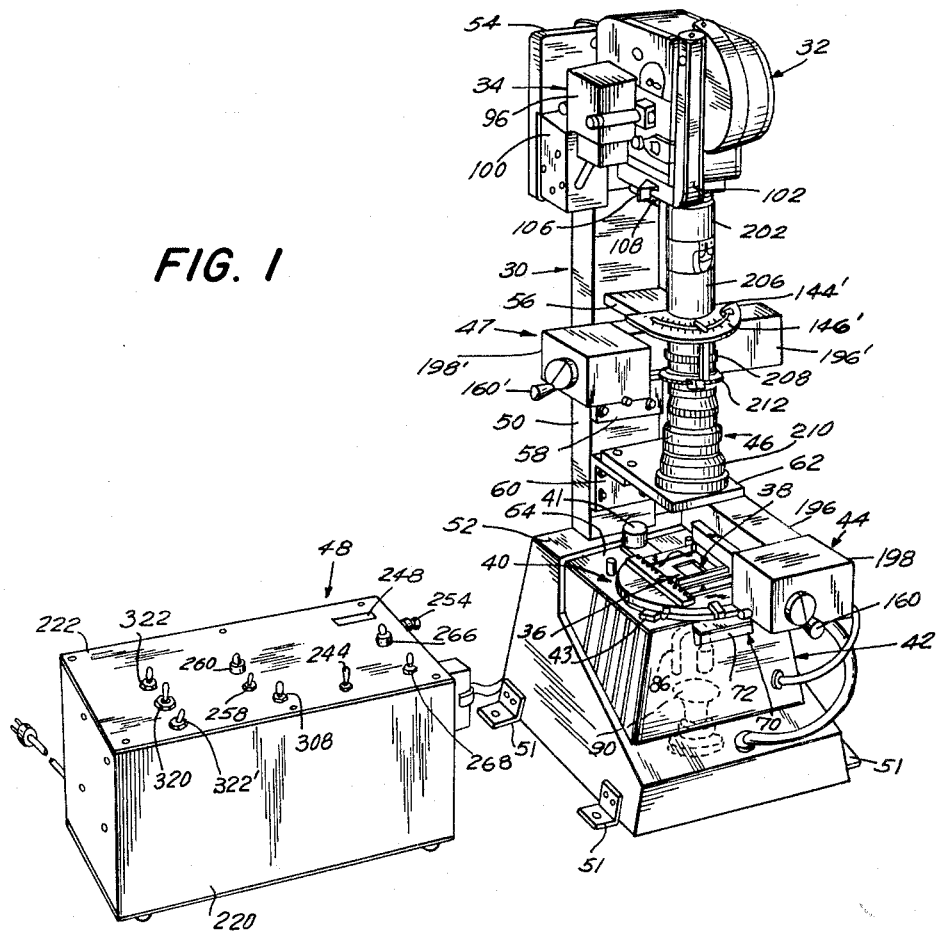
FIG. 1 is a perspective view of the automatic copy instrument with associated control box and slide transparency mounted for reproduction in accordance with the present invention.
Figure 15:
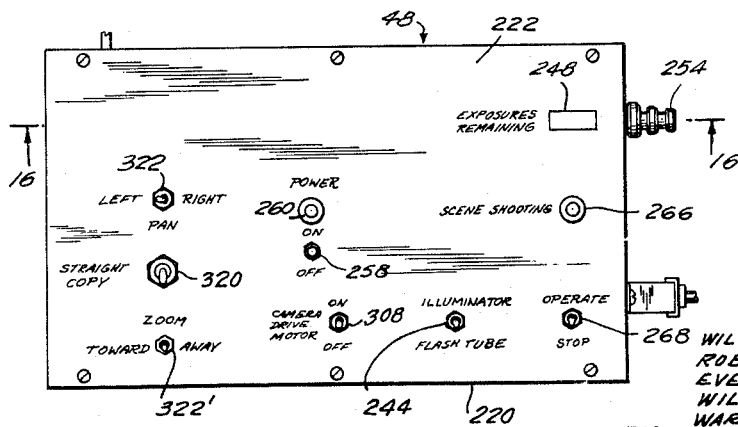
FIG. 15 is a top plan view of the control box illustrated in FIG. 1 showing the details of control panel.

In the drawings an automatic copy instrument is fabricated in accordance with the present invention and is conveniently supported by means of stand 30. In the embodiment of the invention under discussion a 16 mm. camera 32 for taking motion picture film and exposing it to the desired subject is mounted by the stand 30. The motion picture film loaded therein for exposure is automatically advanced frame by frame, on signal, by means of a solenoid actuated film drive 34 conveniently coupled with the casing of the camera 32. A slide 36 to be exposed to the movie frames is mounted by means of a slide holder 38 slidably mounted by a turntable 40. This turntable 40 is adjustably, as well as rotatably, mounted by the base of the stand 30 below the camera and above an illuminating unit 42 within the base of the stand. The turntable 40 is removable or can be locked by knob 41 having a threaded portion 41' which passes through an opening 42' in a wedge shaped member 42" and is threadably received in plate 64. Additional wedgeshaped members 43 in 120° spaced relationship from 42" permit rotation. This flash unit is actuated to produce the desired intensity of light at each exposure of the movie frames to the slide 36 in the holder 38. The turntable 40 is adapted to be rotated to place the slide holder 38 and, consequently, the held slide 36 in any desired orientation with respect to the aperture of the camera 32. A panning mechanism 44 is operatively connected with the slide holder 38 and, under these circumstances, is adapted to shift the holder 36 an increment per exposure to the motion picture film. A panning effect is capable of being produced across the slide along substantially any axis in the plane of the slide.

A zoom optical system 46 is coupled with the camera 32 and adapted to have its optical axis intercept the surface of the slide 36. In this connection, the optical system is adapted to provide a wide range in magnification of the selected part of the slide 36; and because of the built-in zoom lens, the system will have a fixed focus under all magnifications. The zooming effect is accomplished automatically in increments through the operation of drive means 47 coupled therewith.

The presetting of operation, whether it be straight copying, panning or zooming, is controlled by a unit 48 which also serves to synchronize such movements with one another to provide the sophisticated end product desired. This control unit may be an integral or component part of the stand 30 or in the form of a separate control box, as illustrated.

*Stand*

The stand, as explained, serves to mount the functional components cooperating with one another in producing the desired end results in accordance with the present invention. The stand 30 includes the vertical upright or standard 50 extending vertically from the base 52. A support plate 54 is suitably anchored to the standard 50, as for example, by means of a number of strategically located screws or bolts for supporting camera 32 as well as the film drive unit 34. A plate 56 is also connected with the standard 50 and cooperates in aligning the zoom optical system 46 suspended from the camera 32, as shown. A bracket 58 also is secured to the standard 50 and serves to fixedly mount the zoom drive 47. An angle bracket 60, anchored to the upright 50, fixedly supports a plate 62 which threadedly engages with the lower end of the system 46 for providing additional support therefor.

Referring now to the base 52 of the stand 32 which houses the illumination unit 42, together with its associated electronic components. The base 52 includes an upper plate 64. This plate 64 mounts, for rotation thereon, turntable 40 which bears slide holder 38 and panning mechanism 44. The base may be provided with a number of resilient feet 66 for supporting the stand 30 on the selected surface. A number of angled brackets 51 may also be provided for anchoring the stand in place at the selected site.

*Illuminating unit*

The illuminating unit 42, as stated, is contained within the base 52 of stand 30 and serves to supply the necessary light for viewing and exposing the transparency to be copied. The internal light source is thus adapted to be channeled through the aperture 65 of plate 64 and then slide 36 of the disclosed embodiment.

The turntable is formed with an aperture 65' of a size sufficient to permit light supplied by the illuminating unit 42 for the slide 36 or other light transparent sheet to be copied. Covering the aperture 65 is a ground glass diffuser 68. Immediately below the diffuser 68 is a filter holder 70 bearing a handle 72 for permitting the holder to be inserted and withdrawn from the optical axis of the instrument. A color compensator or special effects filter unit 74 is mounted by the holder 70 which may be made up of one or more filters, depending upon the effects desired. Disposed beneath the holder 70, and in the same optical path, is an opal glass diffuser 76 carried by the holder 78 pivotally mounted by the bearing 80 and secured to the plate 64. The lever 82 extends from the holder 78 and permits the diffuser 76 to be retracted to obtain a brighter image for viewing during composing. During actual motion picture exposure, however, the diffuser 76 is returned and disposed coaxially in the optical path. In this connection, the lever 82 is adapted to be anchored in place and released by means of the friction fit 84 cooperable with plate 64.

A flash lamp 86 is mounted interiorly of the base 52 and upon signal is adapted to be energized to provide the desired intensity of light. For purposes of the disclosed embodiment, a satisfactory lamp 86 of the gas discharge variety is available and identified as Fashtube No. UC6–PM supplied by Kemlite Laboratories, Inc., Chicago, Illinois. This particular lamp has the following specifications: glass=6 mm. Pyrex; gas=xenon; volts D.-C.=200–300; and maximum watts per second=30.

A suitable supported cupped reflector 88 surrounds the flash lamp 86 and functions to direct and concentrate the light rays.

In order to facilitate composing the prepared script and presetting the panning mechanism 44 as well as the zoom system 46, previewing the selected slide is provided for in this embodiment. In this connection, a viewing lamp 90 of the incandescent type, with appropriate socket, is supported inside the base 52 beneath the slide 36. To obtain the full benefit of the lamp output, the opal glass diffuser 76 is pivoted away from the optical axis by manually turning the lever 82. Naturally, the diffuser is returned to its initial position upon commencing the exposure cycle.

Camera

Camera 32 is for motion picture film and, as will be explained, is adapted to be actuated to expose one frame at a time. This invention contemplates the incorporation of a commercially available camera; and to this end, in the disclosed specific embodiment, a Bolex H–16 Rex movie camera, made by Paillard Ltd. of Switzerland, is employed. This camera utilizes 16 mm. motion picture film 94 which is moved frame-by-frame by means of the drive motor 96, a standard camera accessory. The motor also serves to actuate the camera shutter 98 in proper sequence. The solenoid 100, as part of the film drive 34, pulses the motor 96 to thereby cause the film frames to advance. The pulsing of the solenoid and advance of the film upon signal will be further discussed shortly.

The standard shutter housing is slightly reworked for the disclosed embodiment. For example, the camera lens assembly is removed to accommodate the zoom optical system 46. In addition, the camera optical viewing system 102, although usable in its commercial form, is modified slightly. Accordingly, the beam splitter of this system is removed and replaced with a rotating mirror 104. This mirror permits composing by cooperating with the system 102 to enable the slide 36 to be previewed during the desired straight copy, pan or zoom sequence.

Figure 8:
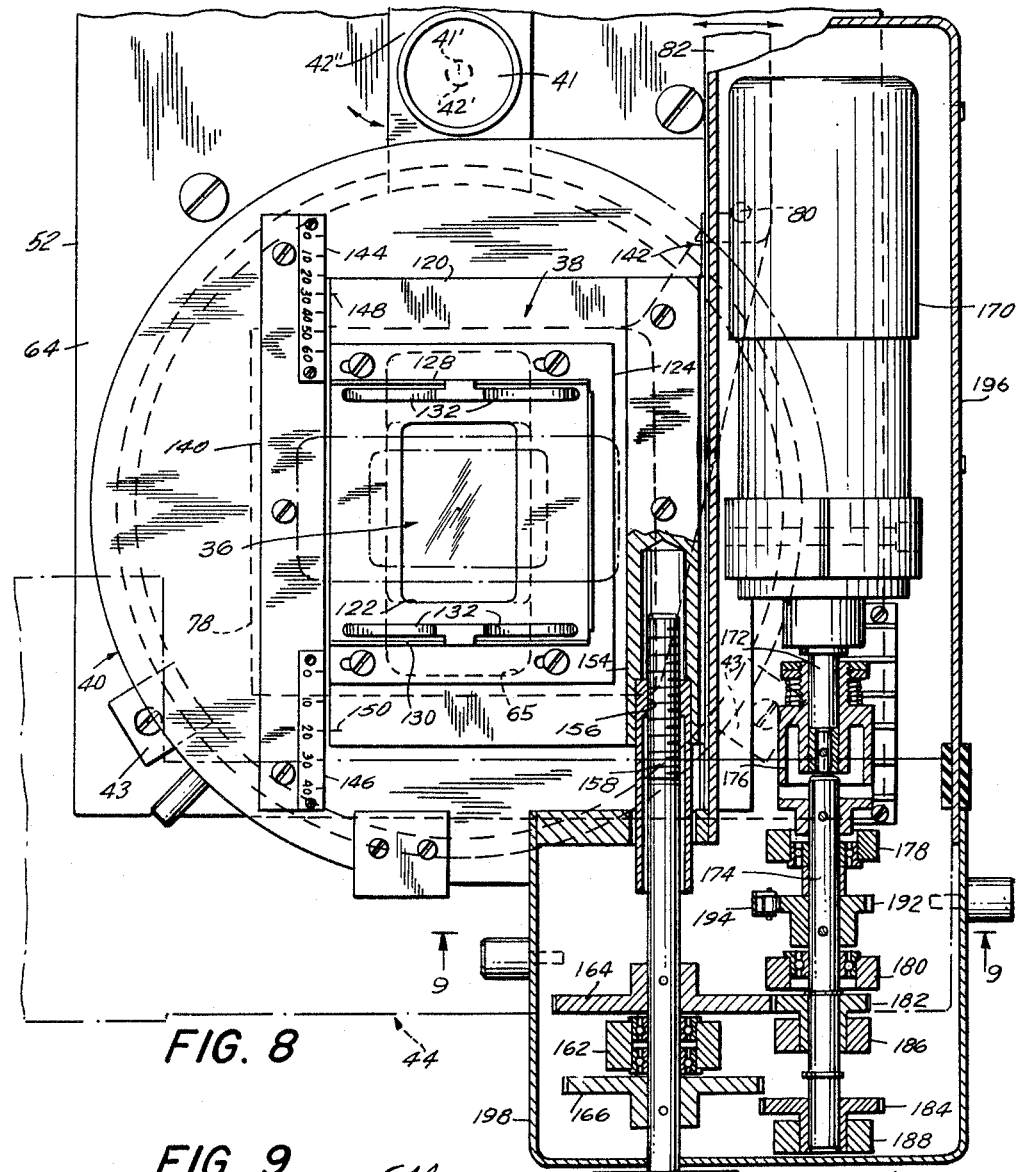
FIG. 8 is an enlarged plan view with certain parts broken away and removed of the slide holder and panning mechanism taken along the line 8—8 of FIG. 4.
Figure 9:
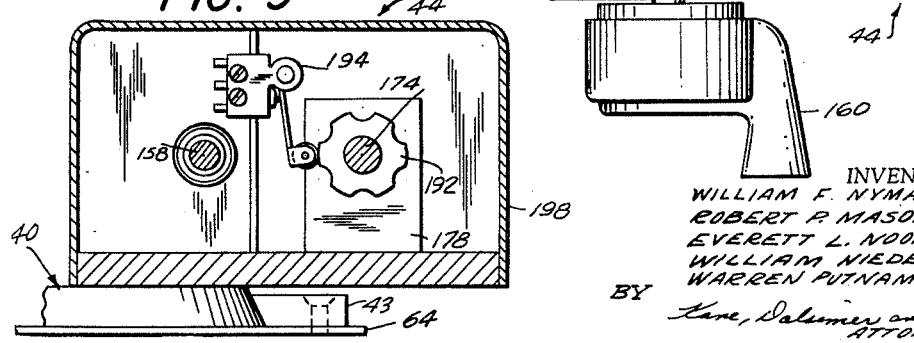
FIG. 9 is a cross sectional view taken along the line 9—9 of FIG. 8.
Figure 16:
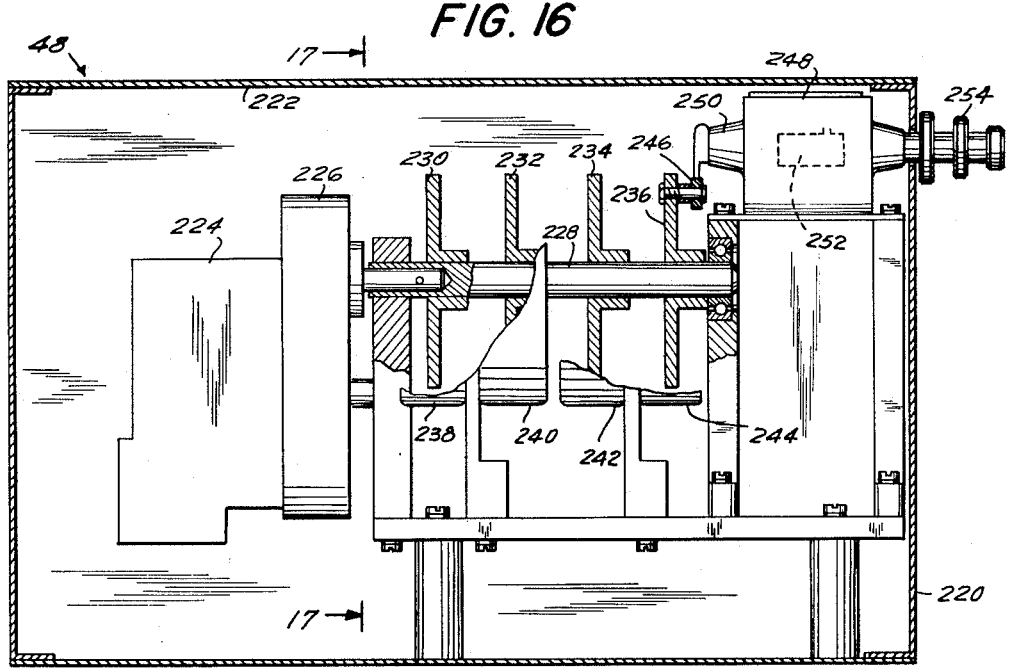
FIG. 16 is an enlarged elevational view partly in section taken along the line 16—16 of FIG. 15.
Figure 17:
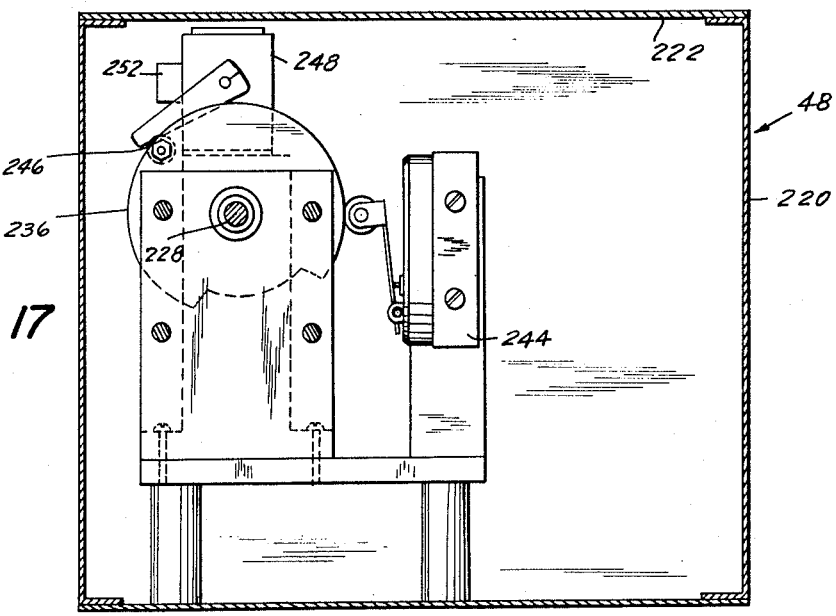
FIG. 17 is a side elevational view taken along the line 17—17 of FIG. 16.

The mirror 104 is further adapted to be shifted away from the optical axis during the actual exposing operation. To this end, the mirror is mounted on a lever 106 pivotal from the preview position (see FIG. 8) to the expose position. In the latter position, the lever 106 is adapted to close a normally open micro switch 108 to enable the exposure cycle to commence. The pin 110 is adapted to engage the lever and stop it at the proper preview position. The spring detent 112 serves to determine both mirror positions and assures that the lever 106 is deliberately shifted between its permissible limits of travel.

Slide holder

The holder 38 of the discussed embodiment conveniently receives the conventional 35 mm. color slides 36. The holder comprises essentially a plate 120 slidable in increments on the turntable 40 and is provided with a central opening 122 for permitting the slide to be illuminated by the unit 42. A thin sheet 124 of metallic stock, for example, fastened to plate 120, also includes an aligned central opening. A pair of spaced legs 128 and 130 extend upwardly from plate 124. Each leg includes inwardly projecting resilient clamping or hold-down arms 132 for maintaining a mounted slide in place. Naturally, the holder would be modified or replaced if other transparencies or sheets were to be copied.

Turntable

The turntable 40, as previously explained, is pivotally mounted by the base 52, as shown. In addition, the turntable supports the slide holder 38 and panning mechanism 44. The holder 38 is mounted in fixed tracks 140 and 142. A pair of scales 144 and 146 form part of track 140 and are associated with indicia 148 and 150. As will be explained, the slide is adapted to shift an increment in integer amounts, per exposure, for panning purposes. The integer is selected to provide a smooth transition during panning. To provide different panning effects, more than one increment amount can be utilized. In the particular embodiment disclosed, one of a pair of panning increments can be selected. Scales 144 and 146 are in units representing revolutions of the drive shaft of the pan drive 44 for convenience because of the difficulty in indicating true integer units. As will be evident, scale 144 indicates 360 increments corresponding to 360 exposures per increment. For the same overall distance scale 146 is broken into 240 increments or 240 exposures. In other words, the unit or integer amount that slide holder 38 moves between exposures when scale 146 is selected is more than the corresponding length represented by scale 144. The increment of travel of holder 38 is controlled by the gear selection of the drive 44. It should be understood that as the increment of displacement between exposures during panning increases, a somewhat unsmooth impression is created by the end product. The shorter the increment the smoother the effect of panning.

Panning drive mechanism

The pan drive mechanism 44 is mounted on the turntable 40 and permits manual shifting of the holder 38 for composing and the automatic movement thereof in preselected increments for actual panning while copying. The holder plate 120, under these circumstances, includes a raised arm 154 having tapped bore 156 engageable with threaded shaft or leadscrew 158. Thus, as the shaft is rotated into or out of the mating bore 156, the holder 38 and consequently mounted slide 36, will be moved. A crank 160 is secured to the outer end of the shaft 158 and facilitates previewing of the panning operation to establish specific limits, knowing the time and number of exposures allotted for the panning sequence. The shaft, inwardly of the crank 160, is journaled in the upstanding arm 162. Gears 164 and 166 are disposed on opposed sides of this arm, with the former providing the 360 increments and the latter the 240 increments of pan.

Panning is accomplished automatically by rotating the shaft 158 by a motor drive which includes the geared-down reversible motor 170. The motor output shaft 172 is coupled with shaft 174 through an interposed clutch 176. The shaft 174 is journaled in arms 178 and 180 and mounts shiftable gears 182 and 184. These gears are respectively meshed with gears 164 and 166 on the shaft 158. Clamps 186 and 188 secure the associated gears 182 and 184 and, at the same time, permit gear displacement on the shaft 174 in selecting the pan increment. A lobed cam 192 is also mounted on shaft 174 and, in the disclosed embodiment, is provided with six detents. The arm of a micro switch 194 is adapted to travel on the circumferential periphery of the cam 192 as it turns. When the switch arm falls into a cam detent, the circuit to the motor 170 is opened resulting in its de-energization. Immediately thereafter, through the operation of the control unit 48, an exposure is made and then the motor is energized once again. This cycle of the panning operation is repeated until a predetermined number of exposures has been made.

A protective casing 196 may enclose the panning mechanism, and in order to facilitate presetting of the desired panning increment, may be provided with a removable cover 198.

Zoom optical system

The zoom optical system 46 is substituted for the usual lens supplied with the camera 32 and provides a zooming effect over a substantially wide range of magnification. Thus, when the desired part of the slide 36 is to be subjected to magnification or reduction, from frame to frame, for a predetermined number of exposures, the system 46, under the control of the zoom drive 47, is adapted to supply this effect in predetermined and selected incremental units.

In this connection, the zoom optical system 46 is advantageously comprised of commercially available components. The system is coupled with the camera 32 and aligned with the optical axis thereof by a lens mount 200 from which extends a tube 202 supporting a relay lens 204. A tubular unit 206 extends from the relay to a zoom lens 208, the other end of which is coupled as closely as possible to collimating lens 210. Broadly stated, this optical system is adapted to place, on a 16 mm. frame, the desired area of 35 mm. slide, whether it be the entire surface of the transparency or a part thereof, at substantially any magnification. In addition, the present invention contemplates the elimination of any need to focus during zooming thereby further adding to the desired automation.

In the specific embodiment disclosed herein, the relay lens 204 is available commercially under the name Macro Tessar No. 42-33-32, supplied by Bausch & Lomb. This relay includes a diaphragm for aperture adjustment. The zoom lens 208, on the other hand, is also available as the Angenieux-Zoom No. 705558, manufactured in France and supplied by Bell & Howell. This zoom lens is set at infinity and is adapted to cover a 16 mm. format with a focal length variable from 17 to 68 mm. With respect to the collimator 210, a Gauss-Tachar F/2, 100 mm. Astro-Berlin lens is utilized and is manufactured in West Germany. This lens is supplied with a diaphragm for special effects, such as vignetting.

The zoom lens 208 has placed thereon a circumferentially extending gear 212 which cooperates with the zoom drive 47 to permit previewing for composing purposes and automatic zooming between the prescribed limits.

*Zoom drive*

The zoom drive includes the worm 158' engageable with the gear 212 and is adapted to be manually, as well as automatically, rotated to correspondingly increase or reduce the magnification provided by the zoom lens 208. As is the case with the pan drive 44, the zooming is executed in preselected increments indicated on a 360 increment scale 144' or the alternative 240 increment scale 146' substantially similar to that employed for the panning increments. Since the zoom drive 47 is otherwise identical with the panning drive 44, both structurally and functionally, a detailed description of both will not be attempted at this time. The corresponding parts will be designated with primes in the drawings.

*Control unit*

The control unit 48 controls, in a synchronous manner, the overall operation of the copy instrument. The unit is enclosed in box 220 having a removable control panel 222. A motor 224, having a reduction gear system 226, is mounted interiorly of the box 220. The drive output of this reduction gear system is transferred to a suitably journaled shaft 228. This shaft has mounted thereon a hold cam 230, shutter cam 232, zoom-pan start cam 234 and flash and counter cam 236. These programming cams, respectively, are adapted to actuate hold switch 238, shutter switch 240, the step or increment initiate switch 242 and the flash switch 244. The cam 236, through its laterally projecting arm 246, serves to pulse counter 248, which may be obtained commercially from the Veeder Root Company, by closing the counter switch 250. Under such circumstances, the shaft 228, together with its mounted programming cams, are adapted to traverse one revolution for a single frame exposure. The counter 248 is of the count-down type which may be preset at a predetermined count at the expiration of which the counter switch 252 will open to de-activate the copy instrument. The counter 248 may be set at the predetermined exposure count through the manipulation of control dial 254.

*Operation*

Figure 18:
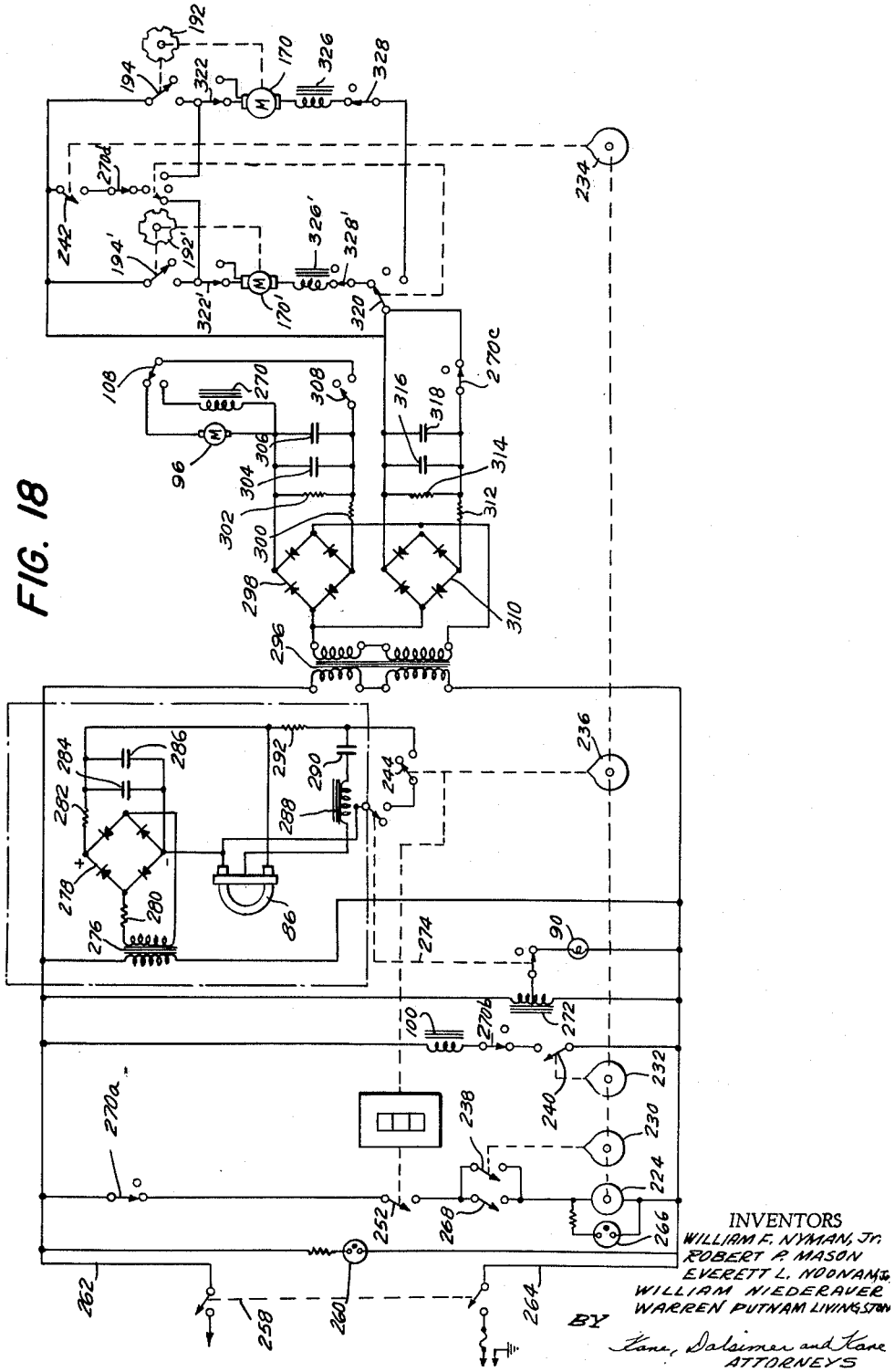
FIG. 18 is a diagrammatic view of the electrical circuitry with associated structure shown schematically.

The operation of the control unit 48 may be best understood by reference of FIG. 18. The instrument, as will be observed, is adapted to be coupled with an electrical energy source through an interposed main power switch 258. The power light 260 is adapted to be energized upon the closure of this switch 258. The motor 224 is connected across the main power leads 262 and 264 and upon motor energization the scene shooting light 266 will be energized. In series with the motor is the operating switch 268 and the counter switch 252 which will be closed during the counting operation and automatically opened when the preset count is reached. The normally closed relay contacts 270a are also in series with the motor. When the micro switch 108 is closed or in the expose position the mirror interlock relay 270 is in a de-energized condition. However, when the switch 108 is in the preview position, the relay 270 will be energized to open its contacts 270a thereby preventing the operation of the motor 224. The hold cam micro switch 238 is connected across the operate switch 268 and, as shown, will enable the motor 224 to continue running for purposes of stopping the programming cams at a proper position with respect to their associated switches upon opening of the operating switch 268. The camera shutter solenoid 100 is connected across the leads 262 and 264 in series with normally open shutter switch 240 adapted to be closed by cam 232 to energize solenoid 100 to thereby open the camera shutter and expose a 16 mm. frame. The camera drive motor 96, under these circumstances, will advance the film to the next frame. The normally closed mirror interlock relay contacts 270b are also in series with the shutter solenoid 100 to prevent it from being energized when the mirror position switch 108 is in the preview position. A previewing lamp transformer 272 is connected across the power leads, and when the switch 274 is in the illuminator position it is adapted to energize the viewing lamp 90.

The primary winding of the transformer 276, of the flash lamp power supply, is connected across the main power leads 262 and 264. In this connection, a conventional power supply need only be employed for the flash lamp 86. Accordingly, a diode bridge rectifier circuit 278 is connected across the transformer secondary through the interposed resistor 280. The rectifier voltage is then filtered by the filter circuit, including resistor 282 and capacitors 284 and 286, connected as shown. The filtered voltage is then applied across the flash lamp 86 through the interposed trigger circuit, which is comprised of the trigger transformer 288, capacitor 290 and resistor 292. Thus, when the switch 274 is in its flash tube position, the flash and counter cam 236 will cooperate with its switch 244 to energize the flash lamp 86 when it is desirable to expose the movie frame in synchronization with the operation of the camera shutter solenoid 100. This very cam 236 additionally serves to actuate the switch 250 at each exposure thus pulsing the counter 248 accordingly.

The primary windings of transformer 296 are connected across the power leads 262 and 264. The output of the transformer 296, after rectification and filtration, is adapted to energize the camera drive motor 96, as well as the pan motor 170 and zoom motor 170'. The power supply for the motor 96 will include the diode bridge rectifier circuit 298, the output of which is filtered by the filter circuit including resistors 300 and 302 and capacitors 304 and 306, connected as shown. Assuming that the mirror position switch is in its closed position, the camera drive switch 308 need only be closed to start the operation of the camera drive motor 96. The voltage for the pan and zoom drives is also rectified by a diode bridge rectifier circuit 310 and then filtered by a filter circuit comprised of resistors 312 and 314 and capacitors 316 and 318. The relay contacts 270c will assume an open position from their normally closed state in the event the mirror position switch 108 is in a preview position causing energization of the mirror interlock relay 270.

If straight copying is desired, the switch 320 is shifted to its still or straight copy position.

When panning is desired, this switch 320 is switched to its pan position and depending upon the position of the left-right or forward-reverse position of the reversing switch 322, the pan motor 170 will revolve to cause panning in one direction or the other. In this connection, a complete incremental advance by the panning mechanism 44 is assured through the operation of the cam 234 in closing the step initiate switch 242 at the proper time. Immediately following the closure of this switch 242, the motor 170 will be energized to drive the cam 192 which will maintain its associated micro switch 194 in a closed position to maintain the motor 170 in an energized condition, notwithstanding the opening of switch 242. When the next detent on the cam 192 is engaged by the arm of the micro switch 194, the circuit to the motor is opened thereby resulting in its immediate de-energization through the cooperation of motor brake 326. The limit switches 328 and 328' are in series with the motors 170 and 170', respectively, and act to stop further rotation of the pan or zoom beyond predetermined limits. The zoom drive 47 operates in substantially the same manner as panning mechanism 44 and, for this reason, will not be described to avoid duplication. Suffice it to say that corresponding parts are designated with corresponding number bearing primes. The interposed relay contacts 270d, as is the case with the companion contacts, will be closed when the mirror position switch 108 is in its expose position.

In summary, the purpose of the copy camera of the specific embodiment as explained, is to produce 16 mm. motion pictures from 35 mm. slides with a minimum of editing after processing. The films capable of being produced may be either black and white or color and may be made from black and white or color slides, negatives or other transparencies. In this connection, other sheet material capable of being copied or reproduced can be advantageously adapted for use with the present invention.

The exposures are made on the 16 mm. film one frame at a time. The rate of exposure of the disclosed specific embodiment is one exposure every two seconds or thirty frames per minute. A light 86 behind the selected slide 36 will be flashed for each slide exposure. Slides may be copied with the slide's format filling the complete 16 mm. frame; or only a portion of reduced size which, in the enclosed embodiment, may be as small as ⅙ the slide area of the slide and still fill the 16 mm. frame. Such adjustments are substantially infinitely variable, with modifications readily apparent to those skilled in the art. The slides may be moved from side-to-side or up-and-down in the plane of the slide at the selection of the operator to produce a panning effect on the 16 mm. film. This movement is automatic and operated by the panning mechanism 44.

Zooming is accomplished similarly and automatically as well through the interaction of the optical system 46 and zoom drive 47.

A picture may be conveniently made by initially selecting a slide 36 and placing it in slide holder 38 in proper orientation, depending upon the selected position of the turntable 40 on the base 52 of the stand 30. A main power switch 258 to the control panel 222 is turned on, together with an illuminator 90, located beneath the slide holder 38. The operator, by manually cranking the zoom drive 47 on the lens system 46, determines the size of picture to be taken, the area of the slides to be covered, or the limits of zoom. In addition, the operator similarly cranks the panning mechanism 44 to place the slide in the proper position laterally for zooming, straight copying or pan determinations. All of these maneuvers will be performed in accordance with the prepared script to compose for automation.

When straight copy is to be done after the slide 36 is in position, the operator turns off the illuminator 90 and then releases spring loaded diffusion glass holder 78. With switch 320 on straight copy the operator then sets the number of pictures desired on the counter 248 of the control unit 48, starts the camera motor 96 and flicks the switch 268 on the control panel 222 to the shooting position. The preselected number of exposures are then made without further attention by the operator. In this connection, after the proper number of exposures have been taken the instrument is automatically shut off.

In performing a panning operation, the operator first traverses the scene with the hand crank 160 to determine the limits of the pan. With the aid of calibrated scales 144 and 146 on the pan table 40 the number of exposures to be taken is determined and the dial 254 set accordingly on the exposure counter 248 of the control panel 222. The pan direction is selected by actuating switch 322 accordingly, the camera and switch 268 turned on again and the scene taken without further attention by the operator.

Zooming is accomplished in a similar manner. The operator will accordingly go through the selected scene with the hand crank 160' to determine the limits of zooming. The number of exposures to be made is then read by means of calibrated scales 144' or 146' and then dialed into the exposure counter 248. The zoom direction is selected and the camera and switch 268 turned on to expose the scene to the calibrated number of movie frames.

The gear system of the pan mechanism 44 and zoom drive 47 may be changed to permit the operator to select either of two panning and zooming speeds in the disclosed exemplary embodiment. It should be understood, however, that it is contemplated by this invention to accomplish this change automatically, as well as manually, to arrive at any number of incremental speeds, over any range with structural modifications readily apparent to those skilled in the art.

It will also be apparent that the copy instrument may be mounted at an incline or at an angle on a relatively low table, or in any other position, so that the operator can work the instrument from a sitting or any other desired position. Illumination for the exposures is provided by a gas filled tube 86 which advantageously emits a light equivalent to that of noon sun and is capable of long life through an appreciable number of flashes. Special effects or corrections of incorrectly exposed slides may be made by insertion of the appropriate filters in the filter holder 72 below the slide table 40.

Change of focus is not required at any zoom magnification. When the slide 36 is placed in the slide holder it is always in focus. The built-in view finder 102 of the camera 32 facilitates motion picture composing and coordination with the prepared script.

The capabilities of an instrument, fabricated in accordance with the present invention, includes the ability to copy a complete slide transparency or negative or other selected and contemplated sheet material. The focal length of the lens system is varied rather expeditiously through the utilization of a zoom lens. A portion of a slide, for example, can be accordingly selected for exposures on a complete movie frame. The same slides can be utilized over and over again. In this connection, the desired slides, or parts thereof, can be bought or borrowed, in composing or for that matter fulfilling the desires of the prepared script. Animation through panning can also be readily accomplished. Many different types of programs and film presentations can be produced in accordance with the present invention such as those peculiarly adapted for training and educational aids or the like. In this manner, the script for the program can be more effectively controlled with the visual end of the program prepared to satisfy the audio end of the presentation which may be added after the audio end has been completed.

Thus, among others the aforenoted objects and advantages among others are effectively attained. Although a single exemplary embodiment has been disclosed in detail herein this invention is in no sense limited thereby but is to be determined by the scope of the appended claims.

We claim:

1. A copying instrument comprising in combination: a holder for receiving a transparent sheet to be copied; a fixed stationary motion picture film camera spaced from said holder and at one side thereof for exposing movie frames of the film to the sheet to be copied; panning means for automatically moving the holder and the sheet held thereby in substantially any prescribed direction in the plane of the sheet to thereby permit preselected portions of the sheet to be exposed to the movie frames; illumination means at the other side of said holder for illuminating the transparent sheet to be copied; drive means for moving the sheet in synchronization with the advance of the motion picture film; film advance means coupled with said camera for automatically advancing the motion film; and programming means for determining the duration of operation of the synchronized drive means and film advance means in accordance with a preestablished calculation.

2. A color transparency copying instrument comprising in combination: a 35 mm. slide holder for receiving a 35 mm. transparency slide to be copied; a fixed stationary 16 mm. motion picture camera spaced from said holder for exposing 16 mm. movie frames to the 35 mm. slide to be copied, motion picture film advance means coupled with said camera for advancing the motion picture film; rear projection means for illuminating the slide; panning means for moving the holder and the slide held thereby in accordance with a prescribed rate of travel along substantially any selected axis in substantially any direction in the plane of the slide to thereby permit preselected portions of the slide to be exposed to the movie frames, drive means for moving the slide in accordance with the prescribed rate of travel along the selected axis in synchronization with the advance of the motion picture film; programming means for synchronizing the operation of the film advance means and drive means in accordance with a prearranged program.

3. A copying instrument comprising in combination: a holder for receiving a transparent sheet to be copied; a fixed stationary motion picture film camera spaced from said holder and at one side thereof for exposing movie frames of the films to the sheets to be copied; illumination means at the other side of the holder for illuminating the sheet; a zoom optical system for magnifying a part of the sheet to be exposed to the movie frames; drive means for changing the magnification of said system in synchronization with the advance of the film; means for advancing said film; and programming means for synchronizing the operation of the drive means and the film advance means in accordance with a prearranged program and for a prescribed duration.

4. A color transparency copying instrument comprising in combination: a 35 mm. slide holder for receiving a 35 mm. transparency slide to be copied; a fixed stationary 16 mm. motion picture camera spaced from said holder for exposing 16 mm. movie frames to the 35 mm. slide to be copied, motion picture film advance means coupled with said camera for advancing the motion picture film; rear projection illumination means for illuminating the slide and a zoom optical system having an optical axis for magnifying a part of the slide to be exposed to the movie frames; drive means for changing the magnification between prescribed limits in preset increments in synchronization with the advance of the motion picture film; and programming means for synchronizing the operation of the film advance means and drive means in accordance with a prescribed program and for a prescribed duration.

5. A copying instrument comprising in combination: a sheet holder for receiving a transparent sheet to be copied; a fixed stationary camera spaced from said holder and at one side thereof for exposing film to the sheet to be copied; illumination means at the other side of the holder for illuminating the sheet; film advance means coupled with said camera for advancing the film and a binary control system for exposing any part of the sheet to be copied at any magnification to the film; programming means for prescribing the part of the sheet to be copied and the magnification thereof in synchronization with the operation of the film advance means and measuring means for determining the duration of operation of the programming means.

6. A color transparency copying instrument comprising in combination: a 35 mm. slide holder for receiving a 35 mm. transparency slide to be copied; a 16 mm. motion picture camera spaced from said holder and at one side thereof for exposing 16 mm. movie frames to the 35 mm. slide to be copied; illumination means at the other side of said holder for illuminating the slide; motion picture film advance means coupled with said camera for advancing the motion picture film; and a binary control system for exposing any part of the 35 mm. slide to be copied at any magnification to the movie frames; programming means for prescribing the part of the sheet to be copied and the magnification thereof in synchronization with the operation of the film advance means and measuring means for determining the duration of operation of the programming means.

7. A copying instrument comprising in combination: a sheet holder for receiving a sheet to be copied; a camera spaced from said holder for exposing film to the sheet to be copied; film advance means coupled with said camera for advancing the film; and an automatic control system for exposing any part of the sheet to be copied at any magnification to the film; and program means for operating the control means in synchronization with the advance of the film and in accordance with a preset program determining the duration of operation of the control means and film advance means, said programming means including measuring means the operation of which causes the deactivation of the film advance means at a prescribed point of time.

8. A color transparency copying instrument comprising in combination: a 35 mm. slide holder for receiving a 35 mm. transparency slide to be copied; a 16 mm. motion picture film camera spaced from said holder for exposing 16 mm. movie frames of the film to the 35 mm. slide to be copied; motion picture film advance means coupled with said camera for advancing the motion picture film; and an automatic control system for exposing any part of the 35 mm. slide to be copied at any magnification to the movie frames; and programming means for operating the control means in synchronization with the advance of the motion picture film and in accordance with a preset program determining the duration of operation of the control means and film advance means, said programming means including measuring means the operation of which causes the deactivation of the film advance means at a prescribed point of time.

9. A copying instrument comprising in combination: a sheet holder for receiving sheet material to be copied; a fixed stationary camera spaced from said holder for exposing movie frames to the sheet to be copied; panning means for moving the film holder and the sheet held thereby in any direction in the plane of the sheet to thereby permit preselected portions of the sheet to be exposed to the movie frames; a zoom optical system for providing a change in magnification of a selected part of the sheet to be exposed to the movie frames while substantially maintaining the sheet in focus; and control means for automatically operating the panning means and zoom system and automatically operate the camera in synchronization therewith, said control means including a programming means for determining the duration of operation of the panning means, zoom system and camera in accordance with a prescribed program and further a measuring means for automatically stopping the operation of the camera and at least one of the panning means and zoom system at a preset point of time.

10. A photographic transparency copying instrument comprising in combination: a holder for receiving a transparency to be copied; a camera spaced from said holder and at one side thereof for exposing film to the transparency to be copied; illumination means at the other side of said holder for illuminating the transparency;

panning means for moving the holder and the transparency held thereby along substantially any selected axis in substantially any direction in the plane of the transparency to be exposed to the film; and a zoom optical system for magnifying a selected part of the transparency to be exposed to the film between prescribed magnification limits; and control means for advancing the film, panning the transparency and operating the zoom system in synchronization with one another, said control means including a programming means for determining the duration of operation of the panning means, zoom system and camera in accordance with a prescribed program and further a measuring means for automatically stopping the operation of the camera and at least one of the panning means and zoom system at a preset point of time.

11. A color transparency copying instrument comprising in combination: a slide holder for receiving a transparency slide to be copied; a motion picture film camera spaced from said holder for exposing movie frames of the film to the slide to be copied; panning means for moving the holder and the slide held thereby in substantially any direction in the plane of the slide to thereby permit preselected portions of the slide to be exposed to the movie frames; a zoom optical system for providing a change in magnification of a selected part of the slide to be exposed to the movie frames; and control means for automatically operating the panning means and zoom system and automatically operate the camera in synchronization there with, said control means including a programming means for determining the duration of operation of the panning means, zoom system and camera in accordance with a prescribed program and further a measuring means for automatically stopping the operation of the camera and at least one of the panning means and zoom system at a preset point of time when a preselected number of frames have been exposed, and means for previewing the established program and for establishing the program and presetting the measuring means.

12. A color transparency copying instrument comprising in combination: a 35 mm. slide holder for receiving a 35 mm. transparency slide to be copied; a 16 mm. motion picture camera spaced from said holder for exposing 16 mm. movie frames to the 35 mm. slide to be copied; motion picture film advance means coupled with said camera for advancing the motion picture film; panning means for moving the film holder and the slide held thereby along substantially any selected axis in substantially any direction in the plane of the slide to thereby permit preselected portions of the slide to be exposed to the movie frames; drive means for moving the slide along the selected axis in synchronization with the advance of the motion picture film; and a zoom optical system having an optical axis for magnifying a selected part of the slide to be exposed to the movie frame, while substantially maintaining the slide in focus, drive means for changing the magnification between prescribed limits in synchronization with the advance of the motion picture film; and control means for automatically operating the panning means and zoom system and automatically operate the camera in synchronization therewith, said control means including a programming means for determining the duration of operation of the panning means, zoom system and camera in accordance with a prescribed program and further a measuring means for automatically stopping the operation of the camera and at least one of the panning means and zoom system at a preset point of time.

13. The invention in accordance with claim 12 wherein said zoom system is so constructed and arranged to maintain the slide to be copied in substantial focus during the magnification change.

14. The invention in accordance with claim 12 wherein a flash lamp adjacent said holder is adapted to illuminate said slide, and means synchronized with the film advance means for intermittently flashing said lamp in step with passage of successive movie frames across said optical axis.

15. The invention in accordance with claim 12 wherein a previewing means for predetermining the number of frames to be exposed and duration of operation of the drive means.

16. The invention in accordance with claim 15 wherein said measuring means is a counter coupled with both the said drive means and the film advance means and operable to de-activate the film advance means and at least one of the said drive means upon the expiration of a preset count.

17. The invention in accordance with claim 16 wherein both of said drive means and said film advance means are motor operated and manual means superimposed on both of said drive means for operating the respective panning means and zoom optical system manually.

18. The invention in accordance with claim 12 wherein means are coupled with the drive means for the panning means for moving the film holder and the slide held thereby at variable rates of travel.

19. The invention in accordance with claim 12 wherein the camera is located on one side of said holder and an illumination means is disposed at the other side of said holder for illuminating the slide.

20. The invention in accordance with claim 12 wherein the camera is fixedly mounted with respect to the slide holder.

References Cited by the Examiner

UNITED STATES PATENTS

| | | | |
|---|---|---|---|
| 1,898,905 | 2/33 | Seitz | 88—24 X |
| 2,051,526 | 8/36 | Jennings et al. | 88—24 X |
| 2,153,902 | 4/39 | Tondreau | 352—87 |
| 2,198,006 | 4/40 | Garity | 352—87 |
| 2,893,289 | 7/59 | Edgerton | 88—24 X |
| 3,060,796 | 10/62 | Muse. | |

NORTON ANSHER, *Primary Examiner.*

EMIL G. ANDERSON, *Examiner.*